R. W. BARKER.
POWER TRANSMITTING MEANS.
APPLICATION FILED JULY 28, 1915.
1,195,552.
Patented Aug. 22, 1916.
3 SHEETS—SHEET 2.
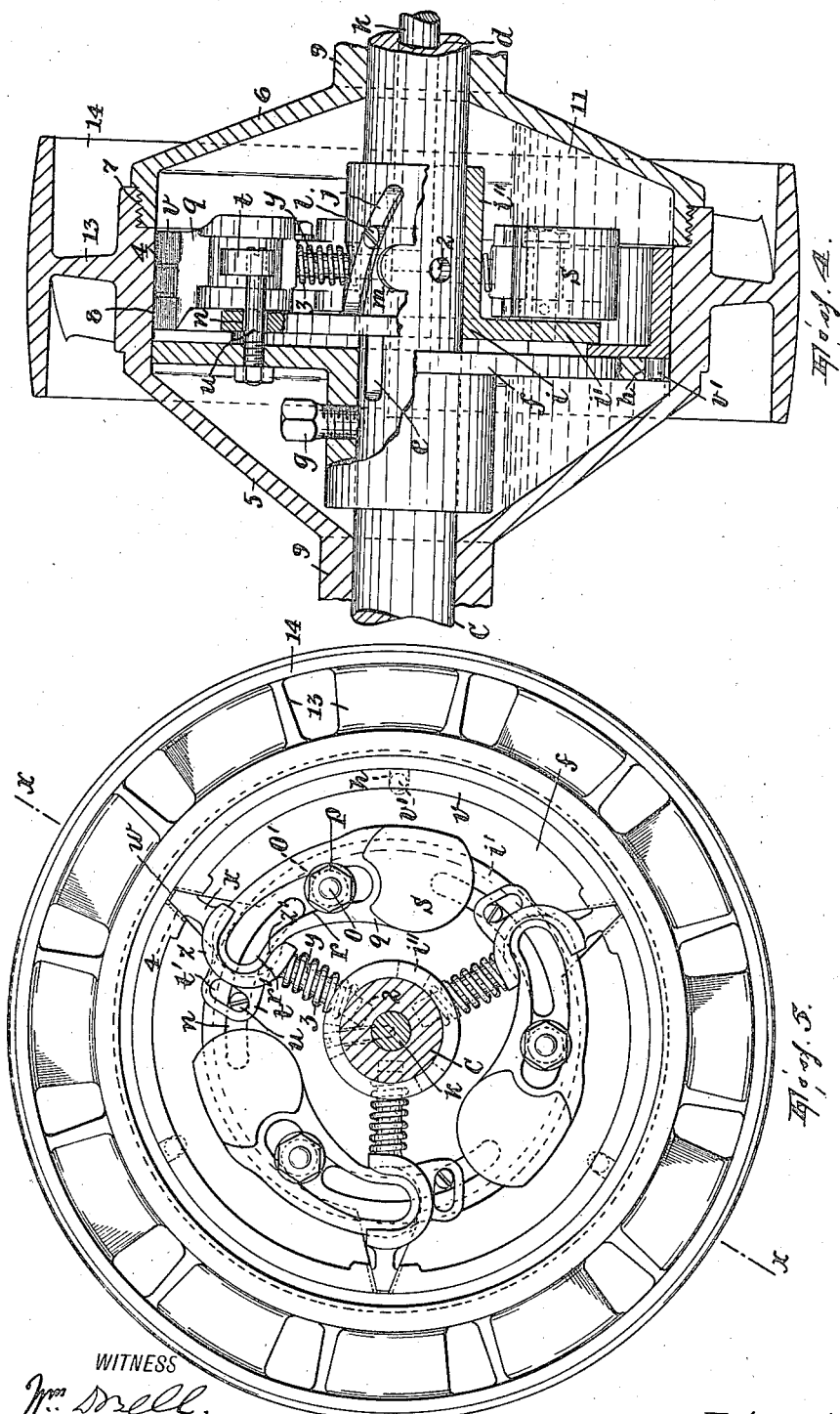
WITNESS
INVENTOR,
Robert W. Barker,
BY
ATTORNEY.

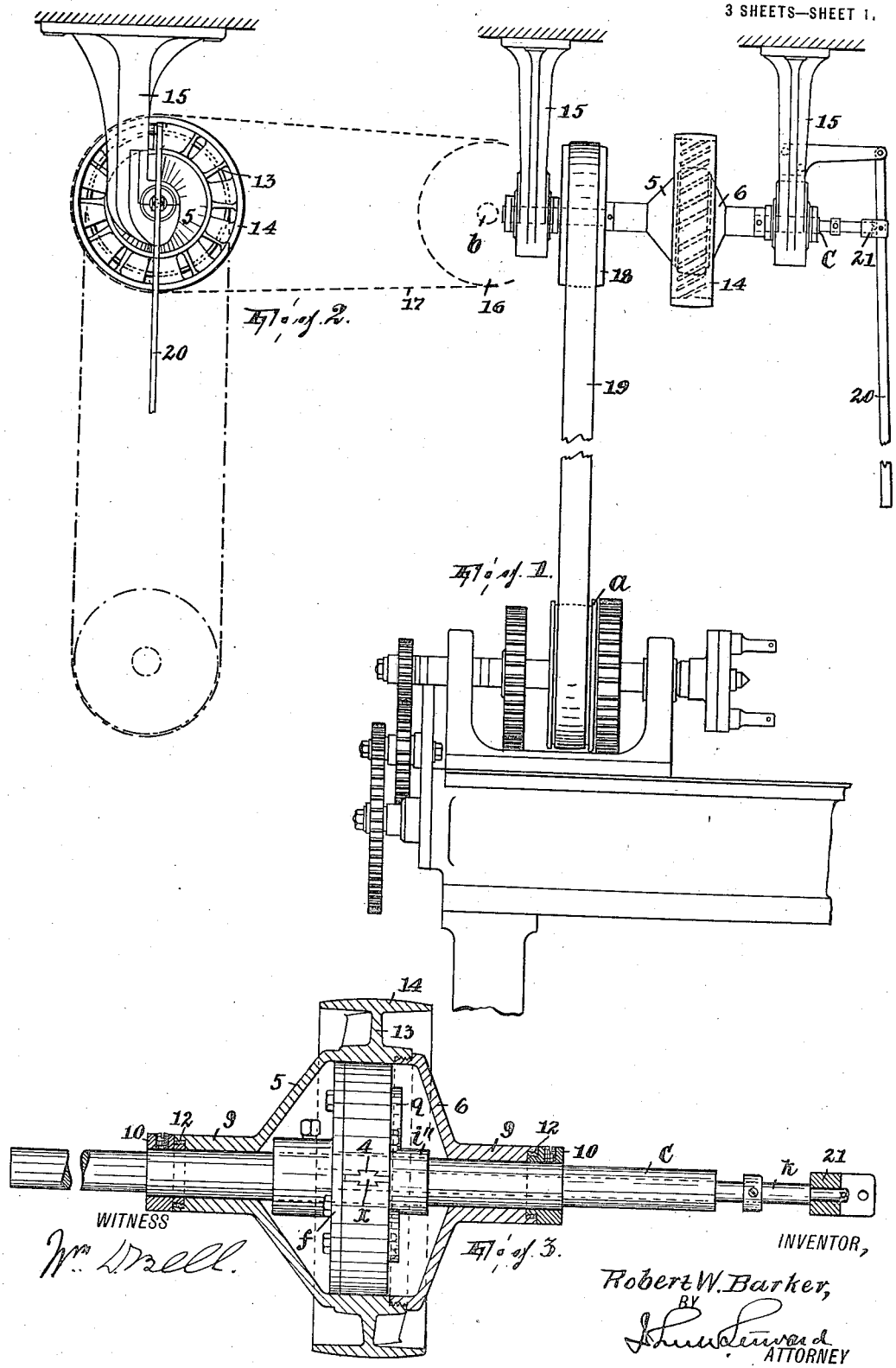

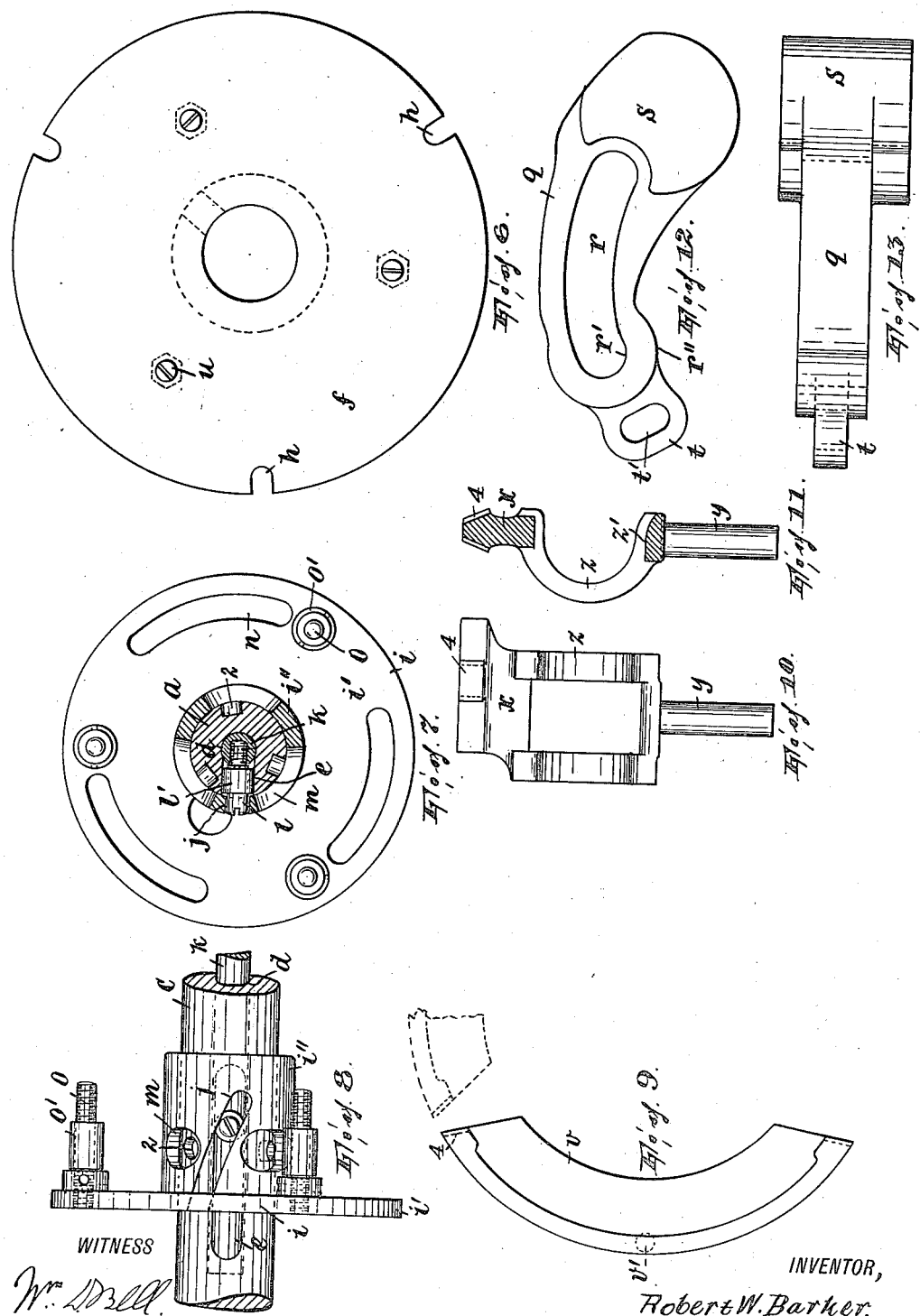

UNITED STATES PATENT OFFICE.

ROBERT W. BARKER, OF PROVIDENCE, RHODE ISLAND.

POWER-TRANSMITTING MEANS.

1,195,552.    Specification of Letters Patent.    Patented Aug. 22, 1916.

Application filed July 28, 1915. Serial No. 42,242.

*To all whom it may concern:*

Be it known that I, ROBERT W. BARKER, a citizen of the United States, residing at Providence, in the county of Providence and State of Rhode Island, have invented certain new and useful Improvements in Power-Transmitting Means, of which the following is a specification.

The object of this invention is to provide a rotary power transmitting means which will automatically stabilize the speed at which the element to be driven runs where, for instance, the load on the latter varies for any reason.

A further object of the invention is to adapt the said means to manual control, so that thereby the driven element may be started and stopped as well as run at any desired speed.

Other objects will appear in the course of the subjoined description.

My invention contemplates a rotary driving member, a rotary driven member, one of which has a part thereof movable into and out of and normally pressed into frictional gripping relation to the other member, and a centrifugal governor movable (in the preferred form, lever-fashion) in one of said members and exerting counter-pressure upon said part.

My invention further contemplates a rotary driving member, a rotary driven member, one having means to frictionally grip the other, an adjustable centrifugal governing means controlling the first means, and means to manually adjust the governing means, the last two named means preferably taking the form of a lever and a manually moved carrier included as a shiftable part of one of said members and affording a shiftable fulcrum for the lever.

My invention further comtemplates means for preserving the parts cool and properly lubricated, in addition to certain novel details of construction having in themselves advantages which will be apparent to those skilled in this art.

In the accompanying drawings, Figure 1 illustrates the invention as employed for transmitting power to a lathe, the view being a side elevation; Fig. 2 is an end elevation, partly diagrammatic, of what is shown in Fig. 1; Fig. 3 shows my power transmitting means partly in longitudinal section and partly in elevation; Fig. 4 is a view similar to Fig. 3 but on a larger scale and showing additional parts in section, the section being on the line $x$—$x$ of Fig. 5; Fig. 5 is a right side elevation of what appears in Fig. 4, the shaft $c$ and control spindle $k$ being in section; Fig. 6 is a right side elevation of the face plate $f$; Fig. 7 is a transverse sectional view of the carrier $i$ for the levers and the aforesaid control spindle therefor; Fig. 8 is a side elevation of the shaft $c$, spindle $k$ and carrier $i$; Fig. 9 shows one of the friction grip segments; Figs. 10 and 11 are elevations at 90° to each other of one of the radially movable thrust members; and Figs. 12 and 13 are a side elevation and a plan of one of the centrifugal levers.

In Fig. 1 $a$ is one of a number of elements to be rotatably driven and $b$ a main shaft from which the power is derived through belts and pulleys (or otherwise) and through the intermediary of the improved power transmitting means. Describing, now, the said means in detail, $c$ is a rotary shaft having a longitudinal bore $d$ extending into the same from one end thereof and a longitudinal slot $e$ formed radially therein and communicating with the bore, and $f$ is a face plate rigidly secured on the shaft by means of a set screw $g$. The face plate has equidistant radial slots $h$ formed therein. Capable of rotatably shifting on the shaft is a carrier $i$ comprising a disk $i'$ and a hub $i''$, the hub having a slot $j$ extending obliquely to the axis of the hub. In the bore $d$ of the shaft is arranged to longitudinally slide a spindle $k$ having a radial stud $l$ equipped with a roller $l'$ which works in the slot $e$, the head of the stud being received by the slot $j$. When the shaft rotates, the carrier of course rotates with it, on account of the interlock afforded by the stud $l$; nevertheless the position of the carrier may be changed rotatively with respect to the shaft by longitudinal movement of the spindle. The hub of the carrier also has slots or openings $m$, and its disk has the concentric slots $n$. The carrier also has threaded studs $o$ arranged equidistantly from each other and from its axis and parallel with the latter, and on said studs the nuts $p$.

$q$ designates one of several levers each having a longitudinal curved slot $r$ and at one end a weight $s$ and at the other a tail $t$ having a slot $t'$ extending transversely of the slot $r$; at the end of the slot $r$ adjoining the slot $t'$ there is a pocket or recess $r'$, and the corresponding end of the lever is formed as a rounded bearing $r''$. On each stud $o$ there is a roller $o'$ received by the slot of and affording a fulcrum for one of the levers $q$. The movement of each lever on its fulcrum is limited by a stud $u$ projecting from the face plate $f$ through one of the slots $n$ in the disk $i'$ of the carrier $i$.

$v$ designates an annular series of segments forming a friction grip device. The adjoining ends of the segments are beveled to form a tapered space $w$ receiving the wedge-shaped outer end of a wedge-piece $x$ which, with said outer end, includes a stem $y$ connected with the part $x$ by a bifurcated arc-shaped yoke $z$, the stems $y$ being stepped in suitable holes 2 driven radially into the shaft $c$ and said stems penetrating the slots $m$ of the hub of the carrier $i$. Interposed between the shaft and the yoke of each wedge-piece and coiled about its stem is a spiral spring 3 normally pressing the wedge-piece outwardly and therefore holding the annular friction device comprising the segments $v$ expanded; upon the wedge-pieces being moved radially inward, the annular friction device will be contracted (in the preferred construction) because of a dove-tailed tongue and groove connection 4 between the tapered end of each wedge-piece and the adjoining ends of the segments. Each segment has a stud $v'$ engaged in one of the slots $h$ of the face plate.

Each lever $q$ has its unweighted end received in the opening of the yoke $z$ of a wedge-piece, its bearing surface $r''$ resting upon the surface $z'$ (Fig. 11) of the yoke.

The shaft $c$, face plate $f$, segments and wedge-pieces constitute (in the present adaptation) the driven member of my power-transmitting means. The driving member thereof may be constructed as follows: 5 and 6 are the two sections of a hollow shell or casing which are connected by the screw joint 7 and the section 5 of which affords interiorly a circular friction grip surface 8. The shell or casing sections 5—6 are provided with hubs 9 (concentric with the friction surface 8) penetrated by and journaled on the shaft $c$, and the driving member, whose sections 5—6 house the expansible and contractible portion of the driven member, is held with its surface 8 in proper relation to be gripped by said portion of the driven member (against movement lengthwise of the shaft $c$) by the collars 10 secured on said shaft and abutting the hubs 9. The shell or casing 5—6 forms a receiver for oil or other lubricant 11, and to prevent the escape of the oil at the hubs, the latter and the collars 10 may be formed at 12 as suitable glands. Concentric with the surface 8 of the section 5 and integrally connected with the latter by the oblique vanes 13 is a rim 14. The vanes 13 serve in the rotation of the driving member to draw air through the latter thus to keep the parts from overheating. The shaft $c$ is hung in hangers 15. On the shaft $b$ is fixed a pulley 16 around which and the rim 14 extends the belt 17. On the shaft $c$ is fixed a pulley 18 around which and the pulley $a$ extends a belt 19. A hand lever 20, fulcrumed in one of the hangers 15, is connected with the spindle $k$ by the coupling 21 swiveled on the latter.

The spring-pressed wedge pieces tend to expand the segments into frictional gripping relation to the surface 8 of the driving member. But so long as the carrier $i$ occupies any position other than its counter-clockwise limit, the outward pressure of the wedge-pieces on the segments is opposed, the mechanism being in rotation, by the counter-pressure thereon of the levers $q$ due to centrifugal force acting to throw the ends of said levers outwardly. This counter-pressure may obviously be varied by shifting the fulcra $o$ relatively to the respective levers (accomplished by moving spindle $k$ one way or the other by means of lever 20), and, given a predetermined load on the driven member, the speed at which the latter will travel will depend on the point to which each fulcrum $o$ is shifted relatively to the corresponding lever. Once the desired speed is established, notwithstanding variations in the load on the driven member the speed of the latter will be substantially constant: Thus, if the load on the driven member should for any reason increase or diminish, any tendency toward corresponding diminution or increase in the speed of said member will be accompanied by a proportionate diminution or increase of centrifugal force on the levers $q$, which thus allow an expansion or effect a contraction (as the case may be) of the segments and vary their frictional pressure on the driving member.

Whatever heat may be developed, due to such slippage as occurs between the driving and driven members, is absorbed by the lubricant 11 and dissipated into the atmosphere by the circulation of air through the driving member induced by the vanes 13.

For bringing the driven member to a standstill, the lever 20 is utilized to turn the carrier to its counter-clockwise limit, in which position the rollers $o'$ on the studs $o$ will have seated themselves in the recesses or pockets $r'$ of slots $r$ in the levers, thereby contracting the wedge-pieces so far that the segments will be clear of the surface 8, it being remarked that the circle in which the inner sides of said rollers lie is of appreciably less diameter than that of the circle in which the pockets or recesses $r'$ are when the wedge-pieces are relaxed and hold the segments in gripping relation to surface 8.

Having thus fully described my invention, what I claim as new and desire to secure by Letters Patent is:—

1. In a speed stabilizing power-transmitting mechanism, the combination of concentric rotary driving and driven members, one having a part thereof movable into and out of gripping relation to the other, a fulcrumed governor device for said part engaged therewith and having a bearing surface extending crosswise of a radius from the axis of rotation of said members, and a fulcrum-affording device for the governor device engaging said surface, one of said devices being shiftable relatively to the other crosswise of said radius to change the point of contact of the fulcrum device with said surface.

2. In a speed stabilizing power-transmitting mechanism, the combination of concentric rotary driving and driven members, one having a part thereof movable into and out of gripping relation to the other, a fulcrumed governor device for said part engaged therewith and having a bearing surface extending crosswise of a radius from the axis of rotation of said members, and a fulcrum-affording device for the governor device engaging said surface, one of said devices being shiftable relatively to the other around said axis to change the point of contact of the fulcrum device with said surface.

3. In a speed stabilizing power-transmitting mechanism, the combination of concentric rotary driving and driven members, one of said members having a part thereof movable into and out of and normally pressed into frictional gripping relation to the other, a fulcrumed centrifugal governor exerting counter-pressure on said part, and a fulcrum-carrier for the governor shiftable in one of said members around its axis of rotation and relatively to said governor.

4. In a speed stabilizing power-transmitting mechanism, the combination of concentric rotary driving and driven members, one of said members having a part of its structure radially movable into and out of frictional contact with the other member and spring-pressed in one radial direction, a centrifugal fulcrumed governor bearing upon said part, and a fulcrum-affording carrier for the governor shiftable around the axis of rotation of said members and having its fulcrum-portion in a different circle from that of the point of contact of the governor with said part.

5. In a speed stabilizing power-transmitting mechanism, the combination of concentric rotary driving and driven members, one having a part thereof movable into and out of gripping relation to the other and including a spring-pressed member normally acting on said part in one direction radially of the axis of rotation of said members, a fulcrumed governor device for said member pivotally engaged therewith and having a bearing surface intersecting said radius, and a fulcrum-affording device for the governor device engaging said surface and shiftable relatively to the governor device to and from the intersection of said radius and surface.

6. In a speed stabilizing power-transmitting mechanism, the combination of concentric rotary driving and driven members, one of said members having means to frictionally grip the other, a fulcrumed centrifugal governor controlling said means, and a fulcrum-affording carrier for the governor manually shiftable in one of said members relatively to the governor.

7. In a speed stabilizing power-transmitting mechanism, the combination of concentric rotary driving and driven members, one of said members having means to frictionally grip the other, a fulcrumed centrifugal governor controlling said means, and a fulcrum-affording carrier for the governor manually shiftable in and around the axis of one of said members relatively to the governor.

In testimony whereof I affix my signature.

ROBERT W. BARKER.